United States Patent [19]
Vidrine et al.

[11] Patent Number: 5,155,551
[45] Date of Patent: Oct. 13, 1992

[54] LASER REFERENCING SYSTEM FOR REFRACTIVELY SCANNING INTERFEROMETER

[75] Inventors: D. Warren Vidrine, San Juan Capistrano; Fred H. Ponce, Garden Grove, both of Calif.

[73] Assignee: Research-Cottrell Technologies, Inc., Irvine, Calif.

[21] Appl. No.: 663,374

[22] Filed: Mar. 1, 1991

[51] Int. Cl.⁵ .............................................. G01B 9/02
[52] U.S. Cl. .................................... 356/346; 356/345
[58] Field of Search ............................. 356/346, 345; 250/237.6

[56] References Cited

U.S. PATENT DOCUMENTS

| | | |
|---|---|---|
| 4,165,938 | 8/1979 | Doyle . |
| 4,190,366 | 2/1980 | Doyle . |
| 4,193,693 | 3/1980 | Schindler ............ 356/346 |
| 4,265,540 | 5/1981 | Doyle . |
| 4,286,877 | 9/1981 | Doyle . |

*Primary Examiner*—Samuel A. Turner
*Assistant Examiner*—Richard E. Kurtz, II
*Attorney, Agent, or Firm*—Howrey & Simon

[57] ABSTRACT

A laser referencing system is disclosed which is used in a refractively scanning interferometer. The interferometer optics comprise a fixed wedge-shaped prism having a beamsplitter surface, a movable wedge-shaped prism, and two corner cube reflectors. A laser clocking beam enters the interferometer on a path below the infrared analytical beam, and leaves the interferometer on a path above the infrared beam. Quadrature control of the laser beams is used to control the ends of the scanning sweeps, eliminating the need for a third, "white light" interferometer beam. ZPD alignment is accomplished by horizontal adjustment of the fixed beamsplitter prism. The interferometer optics are supported three-dimensionally in a cast shell.

14 Claims, 10 Drawing Sheets

PRIOR ART

FIG. 1

PRIOR ART

LASER REFERENCING SYSTEM FOR REFRACTIVELY SCANNING INTERFEROMETER

The subject matter of this application is related to the subject matter of a copending, common assignee application Ser. No. 07/663,592 titled "Three-Dimensional Refractively Scanning Interferometer Structure". That application discloses an improved structure containing an interferometer in which scanning is accomplished by movement of a wedge-shaped prism.

The laser referencing system of this application has numerous advantages over the referencing systems in previous wedge-type interferometers. The availability of these improvements is, in part, a result of the general structural changes discussed in applicants' related application.

Refractively scanning interferometers, i.e., interferometers in which scanning is accomplished by moving a wedge-shaped prism, have proved to be very useful spectrometer components, particularly for use in environments requiring rugged equipment. Such environments are often encountered in non-laboratory situations, such as process control, environmental monitoring, and the like.

A wedge-type interferometer preferably has two fixed mirrors of the retroreflector type, and a wedge-shaped prism which moves across one of the two interferometer arms. The assignee of the present application has four U.S. Pat. Nos. relating to "refractively scanned" interferometers, listed in the order of their application filing dates: 4,190,366; 4,165,938; 4,265,540 and 4,286,877.

In some respects, the laser clocking systems of previous wedge-type interferometers have lacked the maximum obtainable accuracy because of manufacturing difficulties encountered in obtaining high quality optical results at the thin end of the moving wedge. The required length of the moving edge in prior structures was extended by the need to have horizontally-spaced laser beam paths through the wedge beyond each side of the analytical IR beam.

Another limitation in prior wedge-type interferometers has been the need for a third, maintenance-demanding radiation subsystem. The prior art interferometers required three radiation subsystems: (1) the infrared radiation which is the basic analytical beam; (2) a monochromatic (laser) beam which derives pulses from a periodic fringe pattern to "clock" the sampling of detector signals by the computer system; and (3) a wideband, or "white" light beam which is used to start each spectral scanning sweep at the identical point in the spectrum, in order that the integrated spectral data output will have maximum accuracy.

SUMMARY OF THE INVENTION

A major improvement in the wedge-type interferometer is provided by using under-over (vertically-spaced) laser beam paths, instead of the horizontally-spaced laser beam paths of prior wedge-type interferometers. This permits a reduction in the length of the moving wedge. In other words, the incoming laser beam travels below the IR beam, and the returning laser beam travels above the IR beam. It also permits reduction in the size of the retroreflector mirrors.

The improved accuracy provided by the under-over laser beam paths, and by a three-dimensional supporting structure, permits the laser referencing system to incorporate a quadrature system, a very important feature. The quadrature system improves performance in several respects, and eliminates the need for the "white light" optical system previously used to control the starts and stops of the scanning sweeps.

Another result of the under-over laser beam paths is that it becomes possible to simplify the zero path difference (ZPD) adjustment. This can be accomplished by accurately aligning the fixed wedge, which is then locked in position. This simple ZPD alignment was not previously possible because the laser beamsplitter coating differs from the IR beamsplitter coating. In the prior arrangement, horizontal adjustment of the beamsplitter wedge to obtain precise alignment might move one of the laser beam paths onto the IR beamsplitter coating, which is opaque to the laser beam.

DETAILED DESCRIPTION OF PREFERRED EMBODIMENT

Figure 1:
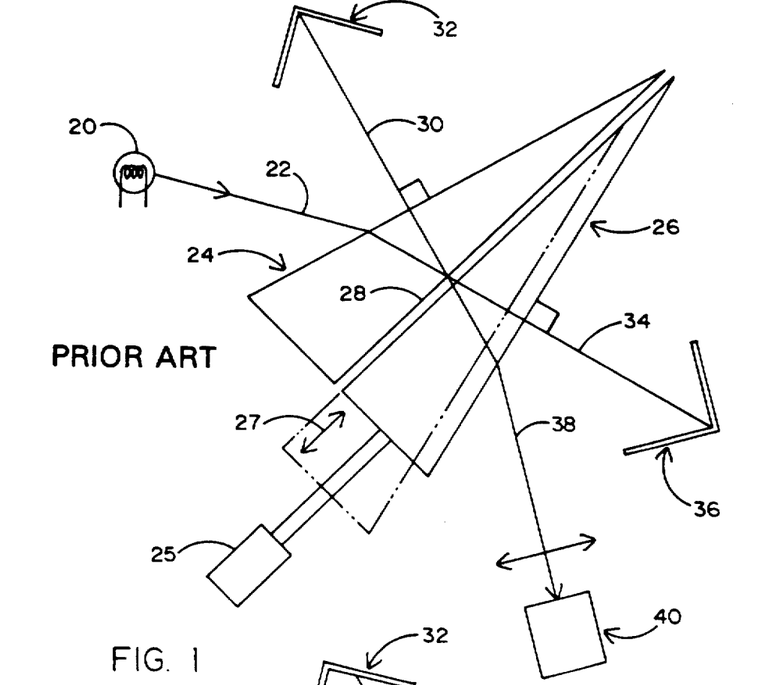
FIG. 1 is substantially identical to FIG. 1 of common assignee U.S. Pat. No. 4,265,540.

FIG. 1 (similar to FIG. 1 in U.S. Pat. No. 4,265,540) shows schematically a wedge-type interferometer of the type currently in production. An analytical radiation beam, e.g., infrared (IR), from a source 20 follows path 22 to a wedge-shaped prism 24. Another wedge-shaped prism 26 is so dimensioned that the refractive effects of prisms 24 and 26 are equalized in the zero path difference (ZPD) position.

One of the wedges 24 is non-movable and carries beamsplitter coating material on its surface 28. The other wedge (26) is movable for scanning purposes by a motor 25 back and forth in the direction indicated by the arrows 27. In the ZPD position of the movable wedge, the path lengths of the radiation through the two wedges are equal. The position of one wedge is initially adjusted to the ZPD position.

The IR radiation beam 22 is partially (half) reflected and partially (half) transmitted by beamsplitter 28. The beamsplitter-reflected radiation travels along a path 30 toward a fixed retroreflecting mirror 32, (e.g., a corner cube). The beamsplitter-transmitted radiation travels along a path 34 toward another fixed retroreflecting mirror 36 (e.g., a corner cube) The radiation path is indicated by a single line in FIG. 1. Generally, the analytical (IR) radiation beam is a one-inch diameter collimated beam.

Returning radiation from the corner cube mirrors 32 and 36 is recombined at the beamsplitter 28. The reflected half of the recombined radiation follows a path 38 toward a detector 40. In spectrometer use, a sample is interposed in the path 38, so that its characteristics are recorded by a detector-produced spectrogram.

The fixed wedge-shaped prism 24 may be shorter than the movable wedge-shaped prism 26. A shorter wedge is inherently easier to manufacture and less subject to radiation distortion problems. The wedges, particularly the moving wedge 26, are the most expensive optical parts of the interferometer. The blanks from which the wedges are fabricated are usually thick circular plates which initially have flat surfaces on both sides. The wedge is formed by removing material from one side of the plate. A smaller wedge is formed from a smaller diameter plate, and it therefore is inherently easier and less expensive to manufacture than a larger wedge.

The moving wedge 26 must be longer than the fixed wedge 24 for two reasons:

(1) Its length must allow for the scanning travel, the length of which is added to the diameter of the infrared radiation beam; and (2) Its length (in the prior art structure) must allow for a referencing (clocking) laser beam, which passes through each wedge on its entering and returning paths, one of which paths is near the thin end of the wedge, and the other of which is near the thick end of the wedge.

Exemplary dimensions involved might be a one-inch diameter IR beam, a wedge travel distance slightly under one inch, and a space of one-fourth inch between each laser beam path and the adjacent edge of the IR beam. The laser beam paths must be outside the IR beam path.

Figure 2:
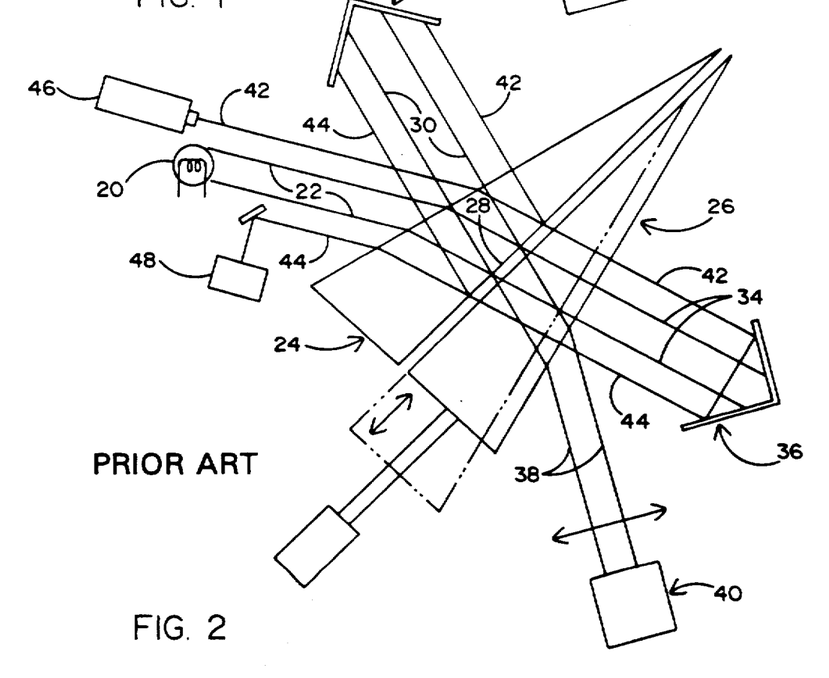
FIG. 2 is the same as FIG. 1, except that it includes the entering and returning paths of the laser clocking beam in the prior art system.

In FIG. 2, the referencing laser beam is shown following a path 42 entering the interferometer, and a return path 44 leaving the interferometer. The laser beam has its own source 46 and detector 48. The primary purpose of the laser (monochromatic) beam is to use pulses from a periodic fringe pattern to "clock" the sampling of IR detector signals by the FTIR system. It also is useful in the process of alignment of the interferometer prior to interferometer operation. In FIG. 2, the spacing of each laser beam path 42 and 44 from the IR beam is exaggerated for easier illustration.

The apparatus of the present application retains the basic prior art structure, including the movable wedge, the beamsplitter coated non-movable wedge, and the two fixed corner cube mirrors. However, its overall structure is significantly different from that of the earlier wedge-type interferometers.

The supporting structure for the interferometer is an important improvement over the prior art. It is so constructed as to: (1) be compact, (2) be very stable and rugged, (3) provide three-dimensional support for the optical elements, (4) permit hermetic sealing, (5) require a minimum number of parts, and (6) permit reliable permanent pre-alignment.

Figure 3:
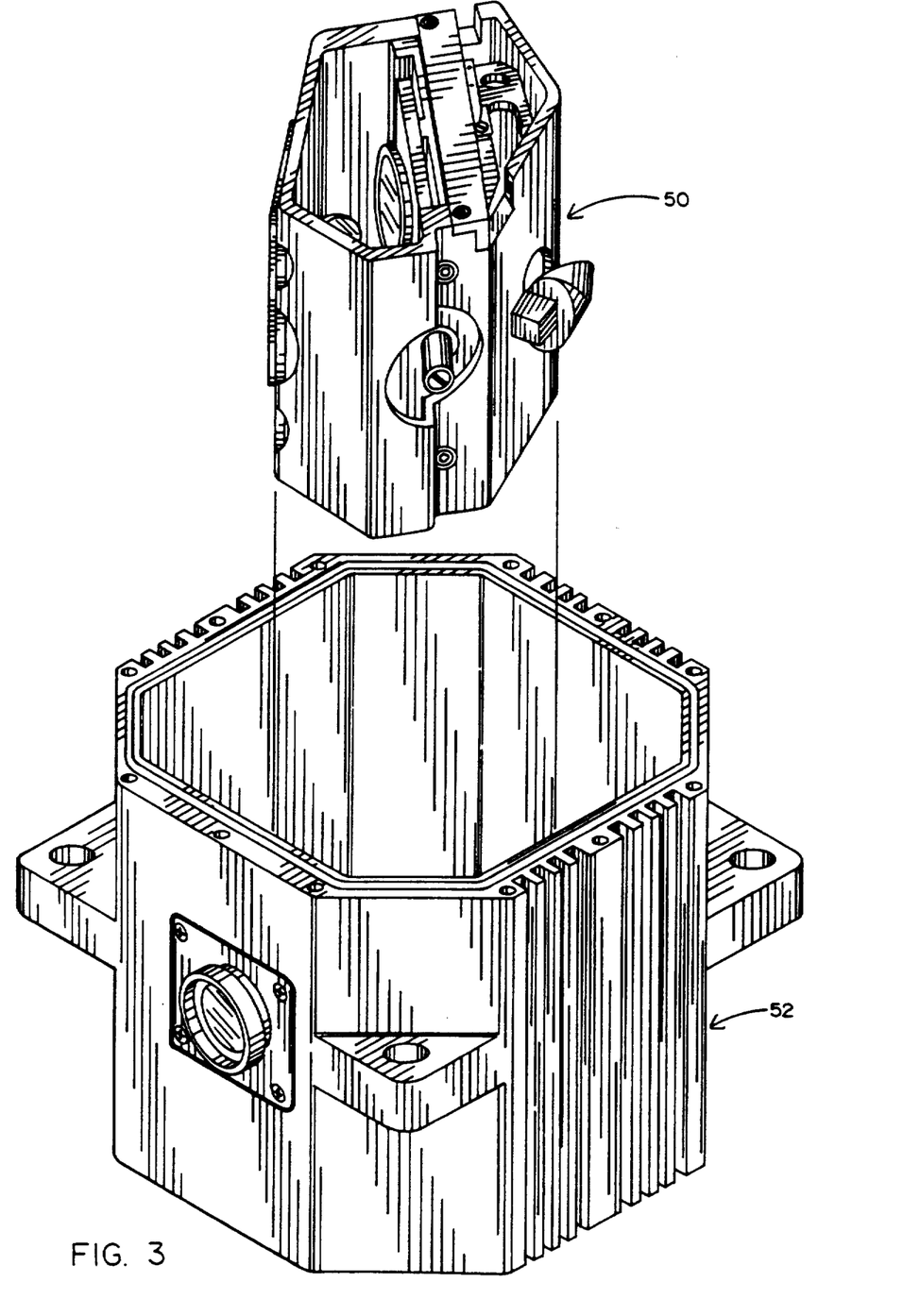
FIG. 3 is an isometric drawing which corresponds to FIG. 3 of related application Ser. No. 07/663,592.

In order to accomplish these goals, two primary shells are used, as shown in FIG. 3. An inner shell 50 provides support for all of the optical elements. An outer shell 52 encloses the inner shell, plus certain heat-producing elements. The outer shell 52 can be hermetically sealed; and it is arranged to function as a heat sink for the heat-producing elements, thus permitting the enclosed interferometer to operate in a relatively cool environment.

The inner and outer shells 50 and 52 are preferably formed as castings. They provide structural rigidity and precision of location for the elements they support. This location precision is particularly important for the inner shell 50, because it permanently positions the optical elements of the interferometer, after their initial alignment.

Figures 4, 5:
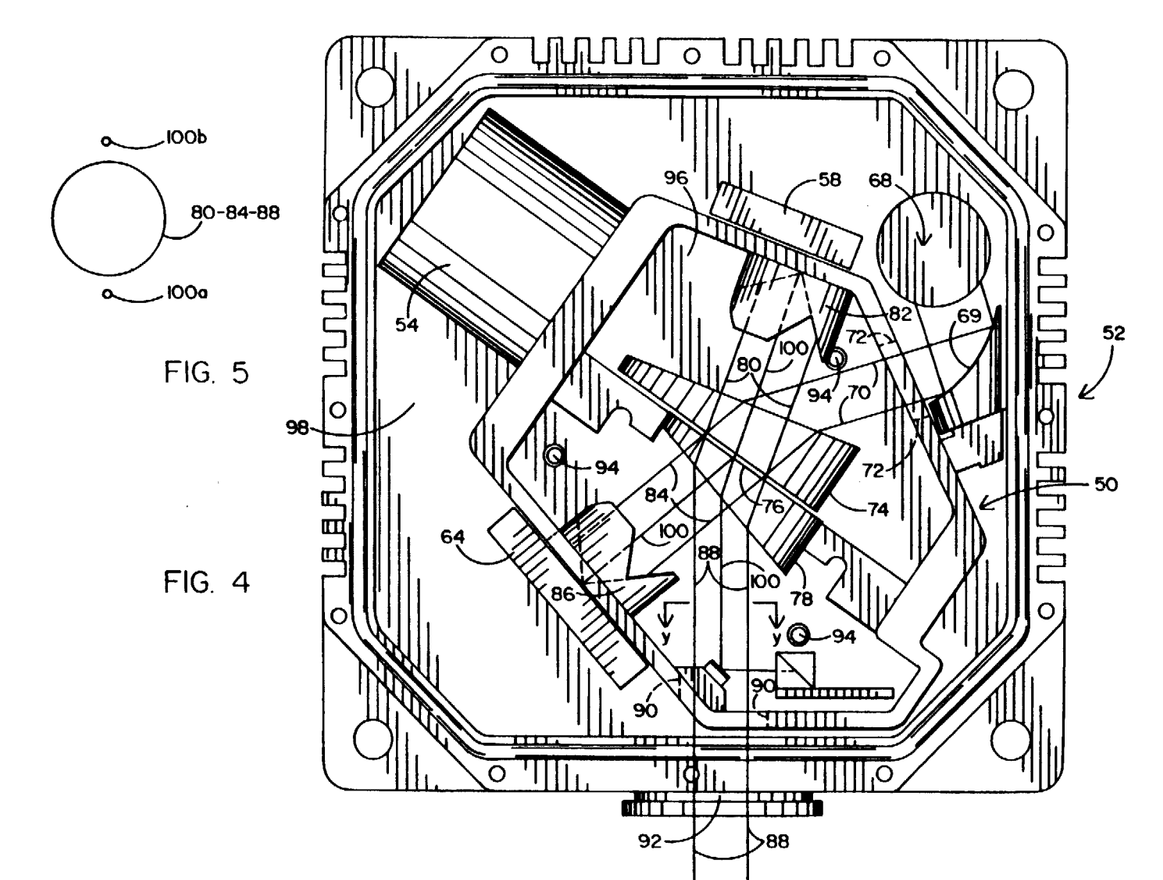
FIG. 4 is a plan view of the assembled structure of FIG. 3, and corresponds to FIG. 6 of related application Ser. No. 07/663,592.
FIG. 5 illustrates the relative positions of the IR beam paths and the two laser beam paths in FIG. 4.

FIG. 4 is a plan view of the entire two-casting structure, showing the positions of the optical elements in the assembled sealable unit. An IR source 68 and a parabolic mirror 69 direct a collimated beam 70 through an opening 72 in inner shell 50. The beam 70 travels through a movable wedge-shaped prism 74 to a beamsplitter surface 76 formed on the inner side of a fixed wedge-shaped prism 78.

The beamsplitter-reflected portion of IR beam 70 travels along a path 80 to a first corner cube reflector 82, which reflects it back to the beamsplitter 76. The beamsplitter-transmitted portion of the IR beam 70 passes through the fixed wedge-shaped prism 78, along a path 84 to a second corner cube reflector 86. Corner cube 86 reflects the IR beam back to the beamsplitter 76, where the two beams are recombined.

IR path 80 constitutes one "arm" of the interferometer, and IR path 84 constitutes the other "arm" of the interferometer. Movement of the wedge 74 across path 80, under the control of a motor 54, varies the length of radiation path 80, thus providing the desired spectral scanning information. The recombined IR beam follows a path 88 through an opening 90 in inner shell 50, and a window 92 in outer shell 52, toward a sample and detector (not shown).

As shown, corner cube 82 is secured to a plate 58; and corner cube 86 is secured to a plate 64. Inner shell 50 is firmly secured to outer shell 52 by means of a plurality of screws 94 which extend through floor 96 of inner shell 50 and into floor 98 of outer shell 52. Floor 98 is a thick metal member, which functions as an effective heat sink member. The IR source 68 is secured directly to floor 98 of outer shell 52.

Line 100 in FIG. 4 represents the path of a laser clocking beam. In the FIG. 4 plan view, a single line 100 represents both the laser beam path below the IR beam and the laser beam path above the IR beam. In FIG. 5, a laser beam path 100a is shown below the IR beam 80-84-88, and a laser beam path 100b is shown above the IR beam 80-84-88.

Figure 6:
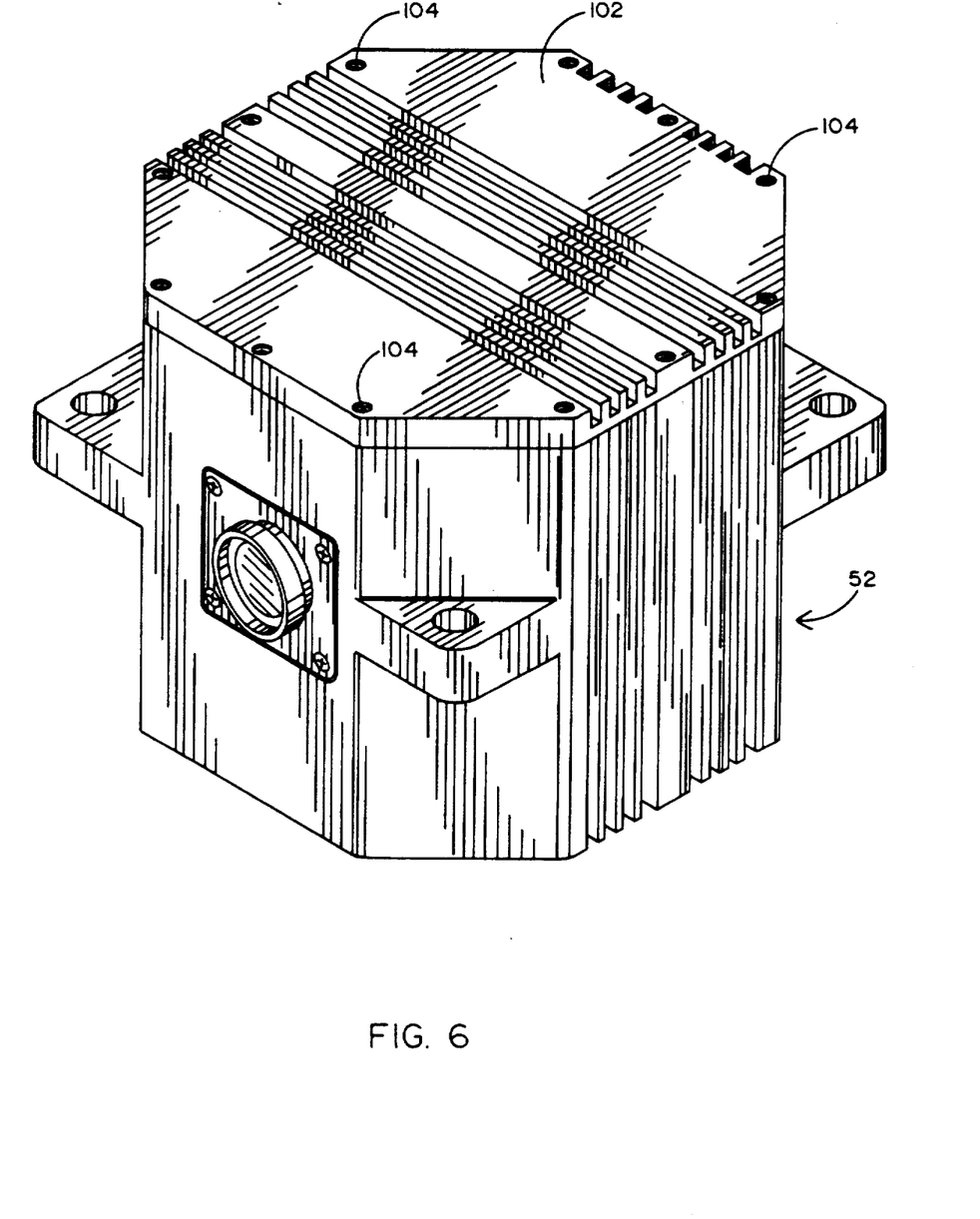
FIGS. 6 and 7 are isometric drawings showing the final assembly of the inner shell and outer shell combination, and the location of the laser beam source.

FIG. 6 shows the final assembly of the inner shell and outer shell combination. In the figure, a top plate 102 is secured to the outer shell 52 by a plurality of fastening members 104. The assembly may be hermetically sealed by an O-ring seal between the outer shell and the top plate.

Figure 7:
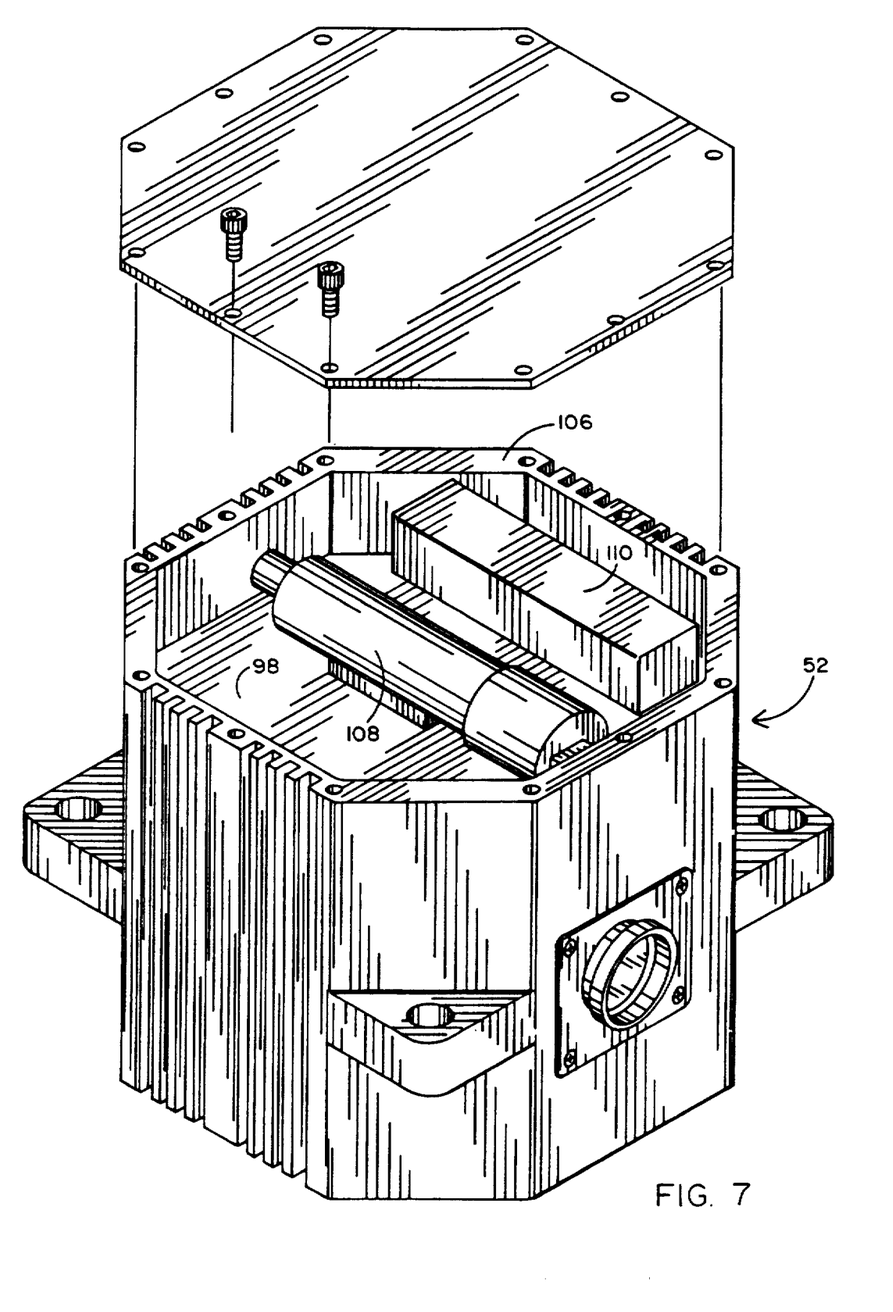

FIG. 7 shows the hermetically sealed unit from the bottom. The floor 98 (FIG. 4) of outer shell 52 is spaced far enough from the lower edge 106 of the outer shell to provide a chamber which houses a laser generator 108 and its power supply 110. A window in the floor 98 permits entry of the laser beam into the interferometer while maintaining the hermetic seal.

Figure 8:
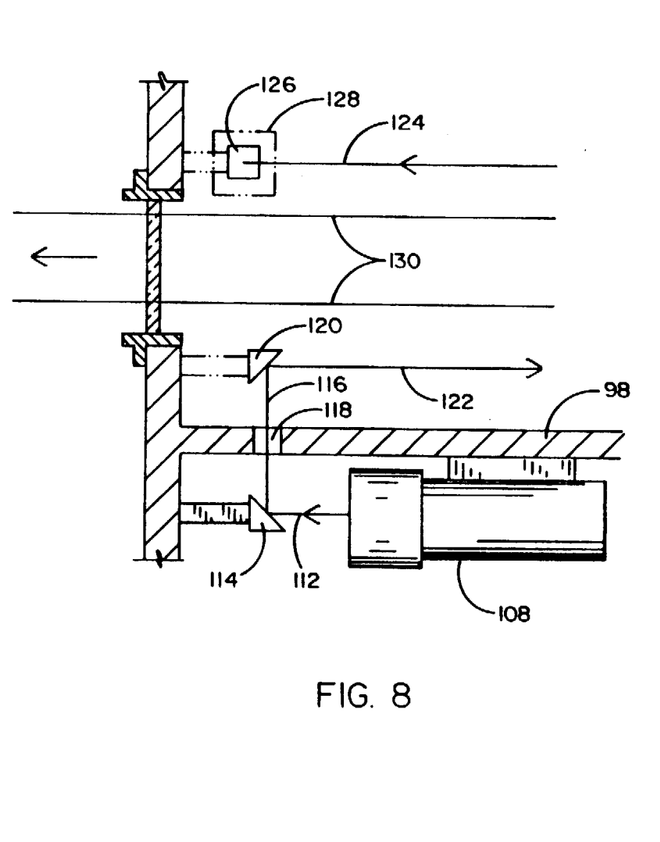
FIG. 8 shows schematically the incoming and returning paths of the laser referencing beam.

FIG. 8 is a vertical section showing the under/over path of the laser beam. As previously stated, this arrangement is a major improvement over prior wedge-type interferometers for a number of important reasons. The laser generator 108 under the floor 98 of the outer shell sends its beam along a path 112. The beam is reflected by a mirror 114, causing the laser beam to travel along path 116, through a window 118 in floor 98. A mirror 120 reflects the laser beam along path 122 into the optical system of the interferometer. The laser in the interferometer passes through the two wedge-shaped prisms, and is reflected by the two corner cube mirrors, thus developing its own interferometer output. The returning laser beam follows a path 124, and is reflected by a mirror 126 to a detector 128. The entering path 122 of the laser beam is below the collimated IR beam, indicted at 130. The returning path 124 of the laser beam is above the collimated IR beam.

Figure 9:
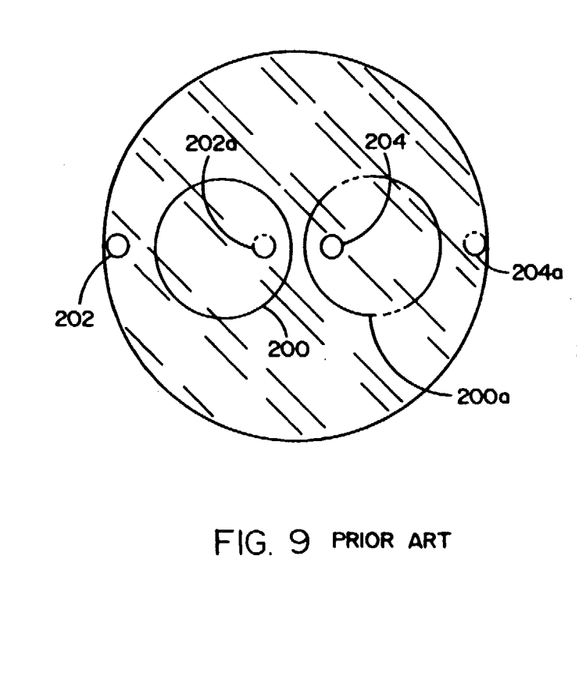
FIG. 9 is an elevation view of a prior art moving wedge made large enough to accommodate horizontally spaced laser beam paths.
Figure 10:
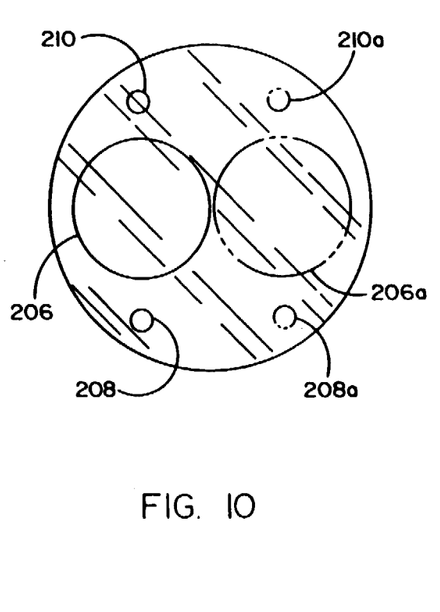
FIG. 10 is an elevation view of the moving wedge of the present invention, in which the laser beam paths are vertically spaced.

FIGS. 9 and 10 illustrate certain of the important advantages of the under/over laser paths. The two figures show the effect of the laser paths on the required size of the movable wedge. FIG. 9 shows a prior art movable wedge. In one extreme position of the wedge, the IR beam is at 200, and the horizontally-spaced laser beam paths are at 202 and 204. In the other extreme position, the IR beam is at 200a, and the horizontally-spaced laser beam paths are at 202a and 204a. The size of the wedge must be large enough to accommodate the laterally spaced laser beam paths.

FIG. 10 shows the relative beam locations using the under/over laser paths. In one extreme position of the wedge, the IR beam is at 206, and the vertically-spaced laser beam paths are at 208 and 210. In the other extreme position, the IR beam is at 206a, and the laser beam paths are at 208a and 210a.

It is clear from comparison of FIGS. 9 and 10 that the present invention permits significant size reduction of the movable wedge, which is the most expensive optical element in the system. Furthermore, in the new arrangement, neither of the laser beam paths is near the thin edge of the wedge, which is subject to distortion problems.

Figure 11:
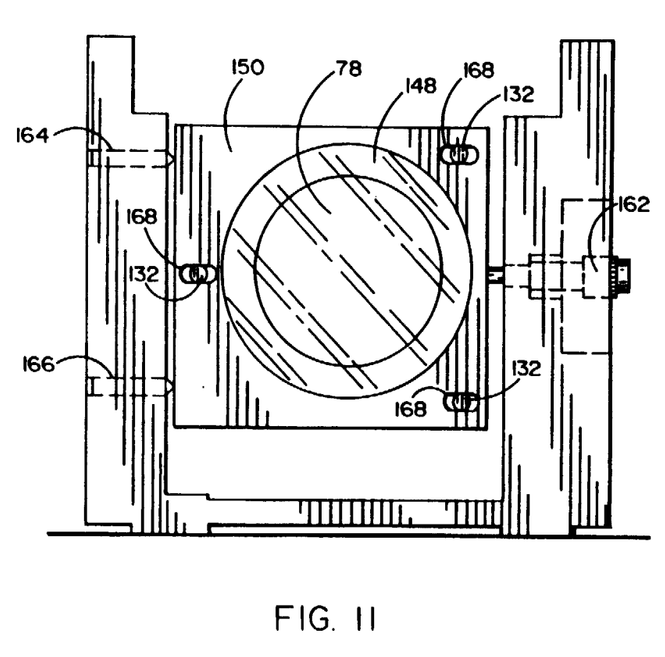
FIG. 11 is an elevation view showing the elements involved in the ZPD alignment.
Figure 12:
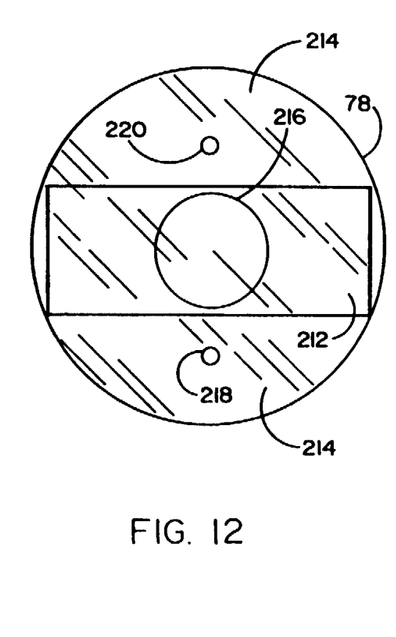
FIG. 12 is an elevation view of the beamsplitter wedge showing the IR coating and laser coating areas.

FIGS. 11 and 12 disclose the reasons why the present invention permits the ZPD alignment to be accomplished by a simple horizontal adjustment of the fixed wedge. This form of ZPD adjustment makes possible the permanent pre-alignment of the interferometer prior to its insertion in the outer shell.

The ZPD adjustment is accomplished by precise adjustment of the fixed wedge in the Z-axis, i.e., in a direction transverse to the optical path of the IR radiation. The laser radiation path is not useful in the ZPD adjustment, only the IR radiation path. The fixed wedge-shaped prism 78, the inner surface of which has the beamsplitter coating 76, is supported in an annular member 148, which in turn is carried by a plate 150. The plate 150 is held against an outer wall of the inner shell 50 (casting) by suitable fastening members (not shown).

In the ZPD alignment adjustment, a micrometer 162 is in engagement with the right side of plate 150, and pins 164 and 166 are in engagement with the left side of plate 150. The plate 150 is constrained to move only in the Z (horizontal) direction by the bodies 132 (of the fastening members) which engage the upper and lower sides of oblong slots 168 formed in plate 150. After alignment adjustment of the fixed wedge 78, plate 150 is securely held in place against the wall of the inner shell, by screwing the heads of the fastening members tightly against plate 150.

FIG. 12 shows why the under/over laser beam paths permit the simple ZPD adjustment just described. The figure shows a vertical elevation of the fixed wedge 78. The IR beamsplitter coating covers the rectangular area 21 of the wedge surface. The laser beamsplitter coating covers the remaining surface 214 of the wedge. The IR beam 216 is confined to the area 212. The lower laser beam path 218 is below the area 212; and the upper laser beam path 220 is above the area 212.

Figure 13:
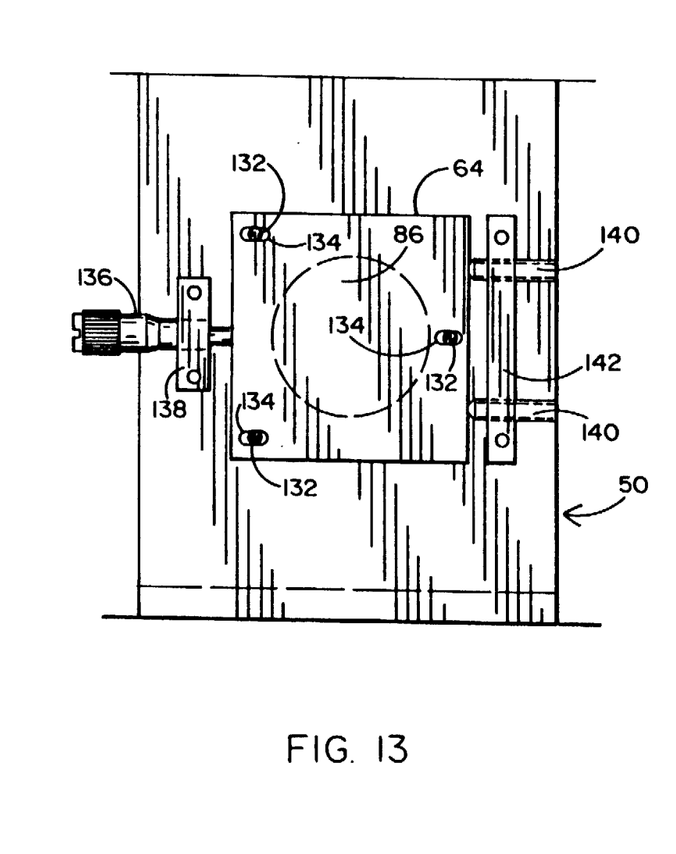
FIGS. 13 and 14, which correspond, respectively, to FIGS. 13 and 14 in Ser. No. 07/663,592, show the X-axis alignment and Y-axis alignment mechanisms of the interferometer.
Figure 14:
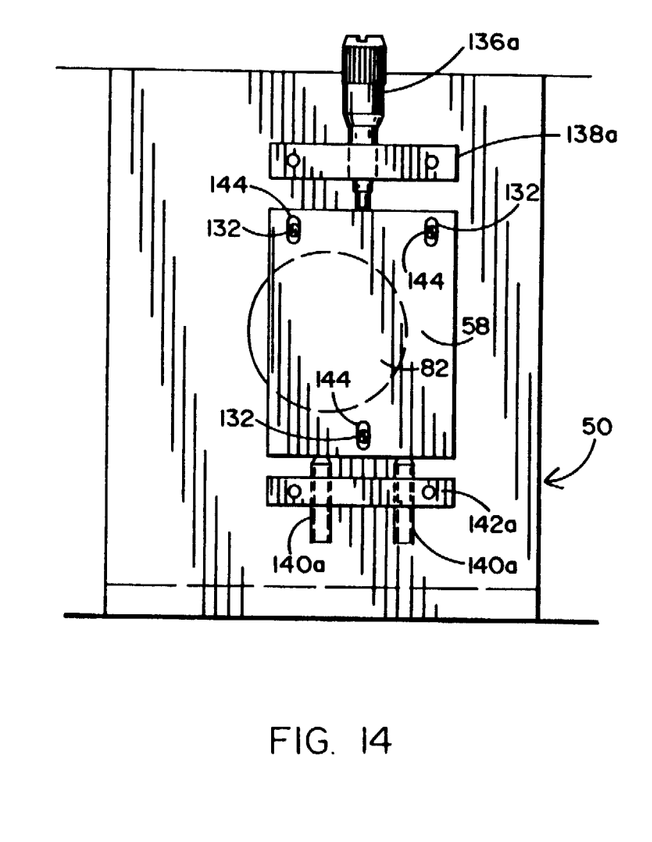

FIGS. 13 and 14 show the X-axis alignment means and the Y-axis alignment means, which are used to initially adjust the positions of the two corner cubes. Micrometer adjusting mechanisms are used for the alignments, and then the micrometer mechanisms are removed, before the inner shell 50 is permanently secured in the outer shell 52. In other words, the present disclosure provides permanent alignment by removable aligning mechanisms.

FIG. 13 shows the X-axis alignment mechanism. The alignment is accomplished by precise horizontal adjustment of plate 64 (FIG. 4). Plate 64 carries the corner cube mirror 86, whose X-axis alignment is accomplished by horizontal adjustment of plate 64. Vertical motion of plate 64 is prevented by the three cylindrical bodies 132 of fastening members which hold the plate 64 in place. The bodies 132 of the fastening members engage the upper and lower sides of oblong slots 134 formed in plate 64, thus preventing vertical motion of plate 64.

Horizontal adjusting motion of plate 64 is controlled by a micrometer 136, which is threaded into a plate 138 secured to the outer wall of inner shell 50. Horizontal adjustment motion of plate 64 is resisted by two plungers 140, which are supported by a plate 142 secured to the outer wall of inner shell 50. In the aligning process, the laser clocking beam is first used to obtain rough alignment. Then the IR beam is used to obtain precise alignment. After such precise alignment, the heads (not shown) of the fastening members, whose inner extensions have threaded engagement with openings in the wall of inner shell 50, are screwed tightly against plate 64, in order to permanently maintain the aligned position of plate 64 and corner cube 86. After alignment, the plates 138 and 142 are disengaged from shell 50, thus removing the adjusting mechanism from the structure.

FIG. 14 shows the Y-axis alignment mechanism. The alignment is accomplished by precise vertical adjustment of plate 58 (FIG. 4). Plate 58 carries the corner cube mirror 82, whose Y-axis adjustment is accomplished by vertical adjustment of plate 58. Horizontal motion of plate 58 is prevented by the three cylindrical bodies 132 of the fastening members which hold the plate 58 in place. The bodies 132 of the fastening members engage the left and right sides of oblong slots 144 formed in plate 58, thus preventing horizontal motion of plate 58.

Vertical adjusting motion of plate 58 is controlled by a micrometer 136a, which is threaded into a plate 138a secured to the outer wall of inner shell 50. Vertical adjustment motion of plate 58 is resisted by two plungers 140a, which are supported by a plate 142a secured to the outer wall of inner shell 50. The vertical adjustment process is performed in the same manner as the horizontal adjustment process. After precise alignment, the heads (not shown) of the fastening members are screwed tightly against plate 58, in order to permanently maintain the aligned position of plate 58 and corner cube 82. Then the adjusting mechanism is removed from the structure.

Figure 15:
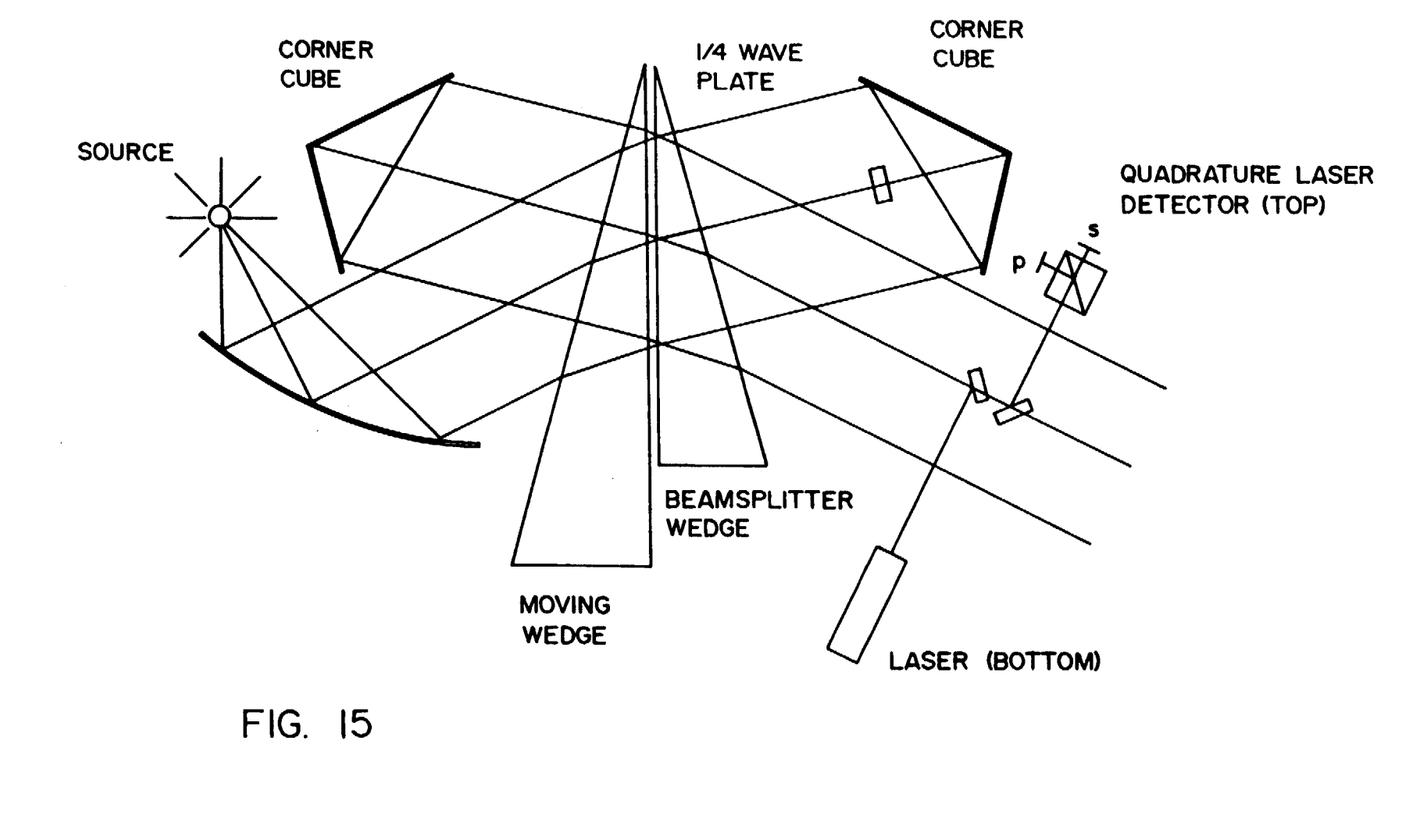
FIG. 15 is a schematic showing a quadrature laser referencing system, which is incorporated in the present invention.
Figure 16:
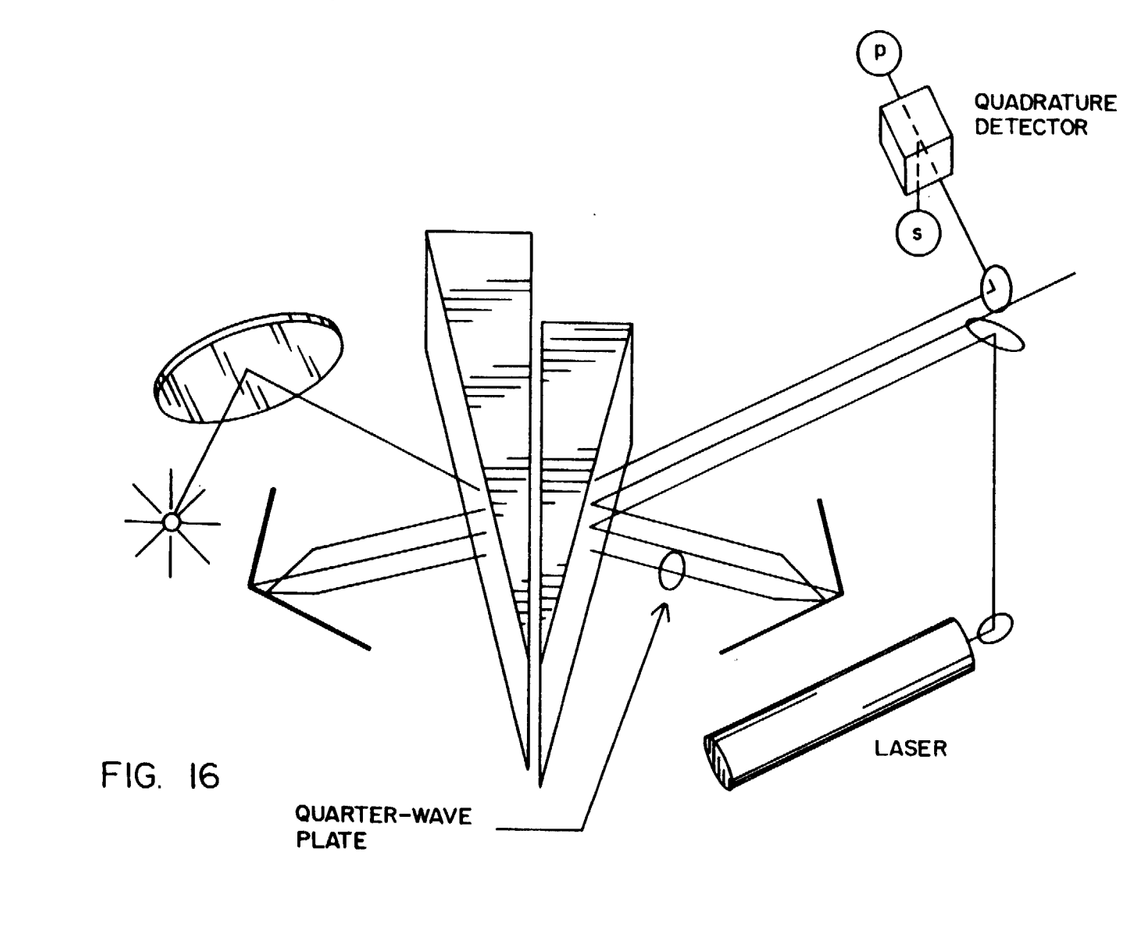
FIG. 16 is an isometric drawing of the quadrature laser referencing system of FIG. 15.

FIGS. 15 and 16 show the quadrature components of the laser beam referencing. Use of laser beam clocking systems for FTIR interferometers is almost universal. The laser referencing system provides very accurate measurement of the time intervals during a scanning sweep. However, the usual interferometer laser referencing system is unable to provide information to determine the point at which a scanning sweep ends; or the point at which a new scanning sweep should start. The standard laser referencing system counts the fringes (intervals), but has no way of determining the points of direction reversal.

A third interferometer signal has been required for controlling the direction reversal function, generally referred to as a "white light" beam. The white light system adds parts to the interferometer, and also has limitations in providing maximum accuracy.

Laser quadrature systems can solve the problem, and eliminate need for the white light systems. They permit the laser system to provide forward and backward referencing of the scanning sweep. Such a system needs a highly accurate laser interferometer. The present application makes laser quadrature feasible in wedge-type interferometers for several reasons: (1) elimination of the distortions caused by the thin end of the movable wedge prism; (2) provision of a very stable three-dimensional mounting structure for the optical components; and (3) use of a dielectric laser beamsplitter coating instead of the previously used Nichrome laser beamsplitter coating.

Three elements are needed to implement quadrature in the laser referencing system. First, the orientation of the laser has to be appropriate. Its polarization must be in a direction such that two convenient orthogonal polarizations can be derived from it, having energy in both polarizations. The laser is oriented halfway between the two desired orthogonal polarizations.

Second, a quarter-wave plate is aligned in one of the arms of the laser interferometer. In the herein disclosed embodiment, the arrangement is such that the beam on the beamsplitter side of the interferometer passes through the quarter-wave plate on its way from the beamsplitter to the corner cube on the beamsplitter side. The orientation of the quarter wave plate is such that one of the orthogonal polarizations is retarded 90 degrees with respect to the other polarization.

Third, a dual laser detector is used, which detects the two orthogonal polarizations separately. The detector assembly includes a polarizing beamsplitter cube which passes one polarization straight through to one detector, and causes a 90 degree reflection of the other polarization, which goes to a separate detector. Thus, there are two detector channels, each having a laser signal. One of the laser signals is retarded 90 degrees with respect to the other one.

Because the sine waves produced by the two laser beam polarizations peak at different times, the direction of the scan is indicated by determining which peak is reached first.

As shown in FIGS. 15 and 16, the laser source 108 (FIG. 8) sends a laser beam on path 232. A mirror 234 reflects the laser beam along path 234 toward the wedge-shaped prisms. The beam passes through beamsplitter wedge 78 (FIG. 4) and reaches beamsplitter surface 76. The reflected half of the laser beam travels along a path 236 toward corner cube 86. As previously explained, the laser paths are vertically spaced from the IR beam 84. In the preferred embodiment, the incoming laser beam is below the IR beam, and the returning laser beam is above the IR beam (the below-above arrangement could be reversed).

The laser beam path 236 passes through a quarter-wave plate 238, which retards one of the orthogonal laser beam polarizations 90° with respect to the other orthogonal laser beam polarization.

Laser beam 236 is reflected from a point near the bottom of corner cube 86 to a point near the top of corner cube 86, and is then reflected along path 240, which is vertically above the IR beam, back to beamsplitter 76, where it recombines with the other arm of the laser interferometer. The other arm is the beamsplitter-transmitted half of the laser beam, which follows path 242 (below the IR beam), is reflected by corner cube 82, first from the lower portion to the upper portion of the corner cube, and then back along a path 244 (above the IR beam) to beamsplitter 76.

The portion of the recombined laser beams which passes to the detector follows a path 246 (above the IR beam) to a mirror 248, which reflects it toward a quadrature laser detector unit 250. The detector unit provides separate detection of the "S" state energy (perpendicular polarization vector) and the "P" state energy (parallel polarization vector).

In FIGS. 15 and 16 an IR source 202 is shown propagating a collimated IR beam which passes through the moving wedge, and is half-reflected and half-transmitted by the beamsplitter surface of the fixed wedge. The paths of the laser beam and the IR beam are spaced vertically as described. In addition to the advantages of the under-over laser beam paths, the disclosed structure avoids any contamination of the IR beam by the laser beam.

From the foregoing description, it will be apparent that the apparatus and methods disclosed in this application will provide the significant functional benefits summarized in the introductory portion of the specification.

The following claims are intended not only to cover the specific embodiments disclosed, but also to cover the inventive concepts explained herein with the maximum breadth and comprehensiveness permitted by the prior art.

What is claimed is:

1. An interferometer of the type having radiation paths along two arms, comprising:
   a movable wedge-shaped prism in one interferometer arm which is movable in a first direction back and forth across the radiation path in the arm to accomplish spectral scanning;
   a fixed wedge-shaped prism in the other interferometer arm adjacent to the movable prism, and having a beamsplitter surface adjacent to the movable prism;

two retroreflecting mirrors, each constituting the end of the radiation path in one arm of the interferometer;

means for directing through the interferometer an infrared analytical radiation beam which passes through both wedge-shaped prisms and is reflected by both retroreflectors; and means for directing through the interferometer a laser referencing beam which also passes through both wedge-shaped prisms and is reflected both retroreflectors, and which follows entering and returning paths that are spaced from each other in a second direction generally perpendicular to the first direction and are parallel to the infrared beam.

2. The interferometer of claim 1 in which the beamsplitter on the fixed wedge comprises:

a central portion having coating material which acts as a beamsplitter for the infrared beam; and upper and lower portions having coating material which acts as a beamsplitter for the laser beam.

3. The interferometer of claim 1 in which the laser-beam-directing-means includes quadrature components which detect changes of direction of the motion of the movable wedge-shaped prism.

4. The interferometer of claim 3 in which the laser beam quadrature components comprise:

a laser beam generator which provides energy in two orthogonal polarizations;

a quarter-wave plate which retards the energy in one of the orthogonal polarizations with respect to the energy in the other orthogonal polarization; and a quadrature detector which detects the energy in the two orthogonal polarizations separately.

5. The interferometer of claim 1 which also comprises:

a three-dimensional supporting structure for the interferometer having a continuous vertical shell, inside which the interferometer beams are contained;

each retroreflecting mirror being secured to a side wall of the shell;

the fixed wedge-shaped prism being secured to the supporting structure throughout its vertical dimension; and means on the supporting structure which provide upper and lower tracks for the movable wedge-shaped prism.

6. The interferometer of claim 3 which also comprises:

a three-dimensional supporting structure for the interferometer having a continuous vertical shell inside which the interferometer beams are contained;

each retroreflecting mirror being secured to a side wall of the shell;

the fixed wedge-shaped prism being secured to the supporting structure throughout its vertical dimension; and means on the supporting structure which provide upper and lower tracks for the movable wedge-shaped prism.

7. The interferometer of claim 1 which also comprises:

means for obtaining zero path difference alignment by adjusting horizontally the position of the fixed wedge-shaped prism.

8. The interferometer of claim 2 which also comprises:

means for obtaining zero path difference alignment by adjusting horizontally the position of the fixed wedge-shaped prism.

9. An interferometer of the type having radiation paths along two arms, comprising:

a movable wedge-shaped prism in one interferometer arm which is moved across the radiation path in the arm to accomplish spectral scanning;

a fixed wedge-shaped prism in the other interferometer arm adjacent to the movable prism, and having a beamsplitter surface adjacent to the movable prism;

two retroreflecting mirrors, each constituting the end of the radiation path in one arm of the interferometer;

means for directing through the interferometer an infrared analytical radiation beam which passes through both wedge-shaped prisms and is reflected by both retroreflectors;

means for directing through the interferometer a laser referencing beam which also passes through both wedge-shaped prisms and is reflected by both retroreflectors; and quadrature means associated with the laser referencing beam for detecting changes of direction of the motion of the movable wedge-shaped prism.

10. The interferometer of claim 9 in which the quadrature means comprises:

a laser beam generator which provides energy in two orthogonal polarizations;

a quarter-wave plate which retards the energy in one of the orthogonal polarizations with respect to the energy in the other orthogonal polarization; and a quadrature detector which detects the energy in the two orthogonal polarizations separately.

11. A method of using a two-arm interferometer to obtain spectral information, comprising:

directing an infrared beam into the interferometer;

causing the infrared beam to be split into a portion traveling in one arm of the interferometer and a portion traveling in the other arm of the interferometer;

moving a prism in a first direction back and forth across one interferometer arm to refractively vary the length or that arm;

directing a paraxial laser clocking beam into the interferometer along a path spaced form the outer edge of the infrared beam in a second direction generally perpendicular to the first direction;

reflecting the laser beam in the second direction at the end of each interferometer arm; and causing the reflected laser beam to exit from the interferometer along a path spaced in the second direction from the outer edge of the infrared beam.

12. The method of claim 11 which also comprises:

causing the laser beam in the interferometer to divide its energy into two orthogonal polarizations; and separately detecting the energy in the two orthogonal polarizations of the exiting laser beam.

13. The interferometer of claim 1, wherein one of the laser beam paths is below the infrared beam and the other of such laser beam paths is above the infrared beam.

14. The interferometer of claim 13 in which each retroreflector reflects the laser beam twice at points vertically spaced from one another.

* * * * *